Dec. 17, 1929.  R. LIBANI  1,740,027

BRAKE DEVICE FOR LIFEBOATS

Filed Sept. 7, 1927

Inventor
R. Libani

By Marks & Clerk
Attorneys

Patented Dec. 17, 1929

1,740,027

UNITED STATES PATENT OFFICE

ROMOLO LIBANI, OF GENOA, ITALY

BRAKE DEVICE FOR LIFEBOATS

Application filed September 7, 1927, Serial No. 218,058, and in Italy July 7, 1927.

This invention relates to improvements in or relating to brake devices for lowering lifeboats, specially adapted for use in connection with the system described in my prior Patent No. 1,587,531; and has for its object to provide a new and improved device by means of which the lowering speed of lifeboats is automatically regulated, means being also provided for varying the said speed, or even to stop the lowering of the boat by a suitable hand control.

A further object of the invention is to provide a more simplified form of the brake device described in the said prior patent, the improved brake being at the same time of stronger construction by parity of weight and requiring a minimum of space for mounting and operation.

A preferred embodiment of the invention is described with reference to the accompanying drawing, in which.

Figure 1:
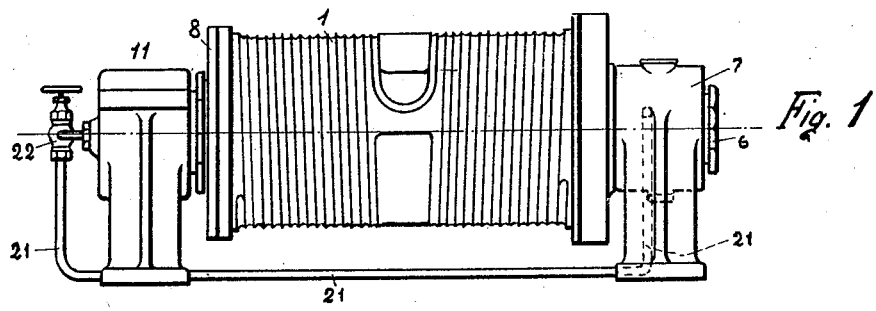
Figure 1 shows a side elevation of the improved brake device.

The hollow cylinder 1 is externally grooved as a drum for coiling the boat hanging ropes, that directly or indirectly support the boat, as in my principal patent, above referred to. The cylinder is axially bored to make a tight sliding fit with a piston 2 and packing ring 3.

One of the cylinder ends is tightly closed by an end cap 4, which may be in one piece with the cylinder and is preferably cast with a suitable hub member or rotatable journal 5 journalled in a suitable bearing 6 mounted in a suitable supporting upright 7. The opposite end of the said cylinder 1 is closed by a suitable cylinder head 8 fastened thereto in any convenient manner as by screws. The cylinder head 8 is centrally shaped to form an axial sleeve 9 rotatably mounted on a hollow journal 10 extending into the cylinder and externally fastened in a suitable supporting upright 11. A suitable packing gland 12 is mounted in an annular chamber in the sleeve 9, and provides for a tight joint between the sleeve 9 and the journal 10. The piston working into the cylinder 1 comprises a head 2 preferably cast in one piece with a central rod 13 extending from one side of the head, the rod being externally screw threaded for screwing into a corresponding thread 14 in the hollow journal 10. A cylindrical hole is bored through the piston head 2 extending almost the whole length of rod 13, this bore being adapted to receive a bar 15 extending into a socket 16 and fastened to the journal 5 by means of a key 17. The part of the bar 15 fitted into the bore in the piston head is formed with a longitudinal rib 18 or may be suitably grooved for a key connection with the piston and rod, a corresponding axial groove being axially cut into the said bore. Thus the bar 15, by revolving, will cause the piston 2 to revolve with it, at the same time allowing any axial displacement of the latter in the cylinder 1.

The hollow fixed journal 10 is formed beyond the threaded portion 14 with a blind chamber 19 of a substantially greater diameter than the piston rod section 13 and the interior of this chamber remains in communication with the adjacent cylinder chamber through suitable narrow passages 20. The other cylinder chamber, for instance that portion of the cylinder remaining on the opposite side of the piston, communicates through the interior of the journal 5 and bearing 7, by passage 23, with a suitable port 24 to which a pipe 21 is connected, leading through a suitable valve 22 to a port opening into the chamber 19 ending in a threaded neck portion forming the hollow journal 10. Suitable connecting and packing means provide for the tightness of all joints.

Figure 2:
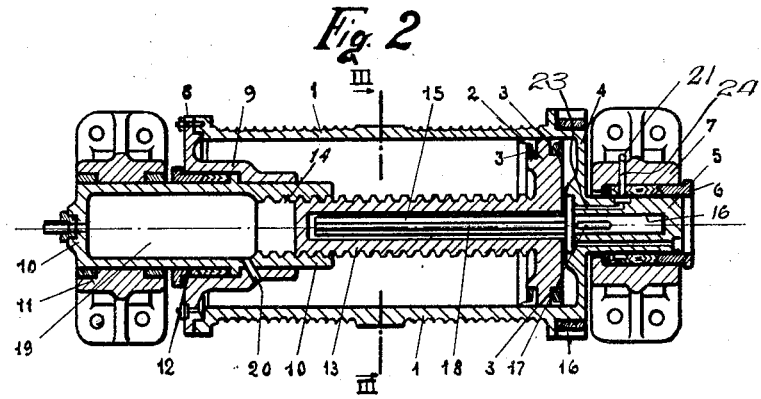
Figure 2 is an horizontal section through the axis of rotation of the device and Figure 3 is a transverse section on line III—III of Figure 2.
Figure 3:
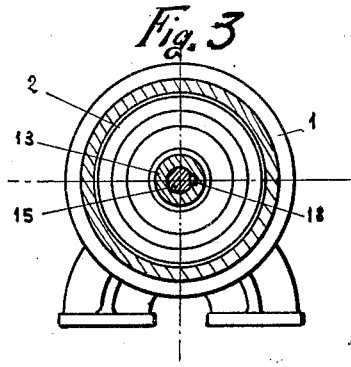

When ready for working, both cylinder 1 and chamber 19 should be filled with a viscous liquid, such as glycerine, oil or the like. When the ropes coiled around the drum are in tension, by suitably opening valve 22, liquid will be allowed to pass from one chamber to the other of the cylinder, through pipe 21 and thus the piston 2 will be allowed to slide along the cylinder bore. This will be possible as the drum will be rotated by the ropes uncoiling by action of the weight of the boat, but by the axial key connection of the piston with the cylinder through bar 15 fastened to revolving journal 5, the cylinder will rotate with the piston 2, 13. Now by means of the screw thread of rod 13, the piston by being carried along in its rotation with the cylinder, will cause its rod to screw into the hollow journal 10 by means of the thread 14 and will be forced to slide to the left as shown in Fig. 2. This movement will not be obstructed by the said slidable key connection of the bar 15 within the axial bore through piston head and rod. The movement of the cylinder may be instantaneously stopped by shutting said valve.

While I have described this embodiment of my invention as a valuable improvement to the device described in my said prior patent, I do not confine myself to the embodiment described and shown in the present specification as I am aware that other modifications will be possible without departing from the spirit of the invention.

I claim:

1. A brake device of the class described comprising a hollow rotatable drum, means for supporting each end of the drum, one of said supporting means including a fixed hollow cylinder extending into said drum, a piston, means on said piston to permit axial movement thereof in the drum and prevent relative rotation of the piston and drum, a threaded rod secured to said piston, and threaded means on the interior of said cylinder cooperating with said threaded rod to cause axial displacement of said piston when the drum is rotated.

2. A brake device as claimed in claim 1, said cylinder having a passage therein to provide communication between the interior of the cylinder and the chamber formed between one end of said drum and said piston, and a conduit connecting said cylinder with the other end of said drum.

In witness whereof I affix my signature.

ROMOLO LIBANI.